Jan. 23, 1968  D. A. DIXON  3,365,307
METHOD FOR MINIMIZING DETERIORATION
OF PLANT AND ANIMAL PRODUCTS
Filed Jan. 10, 1966  3 Sheets-Sheet 1
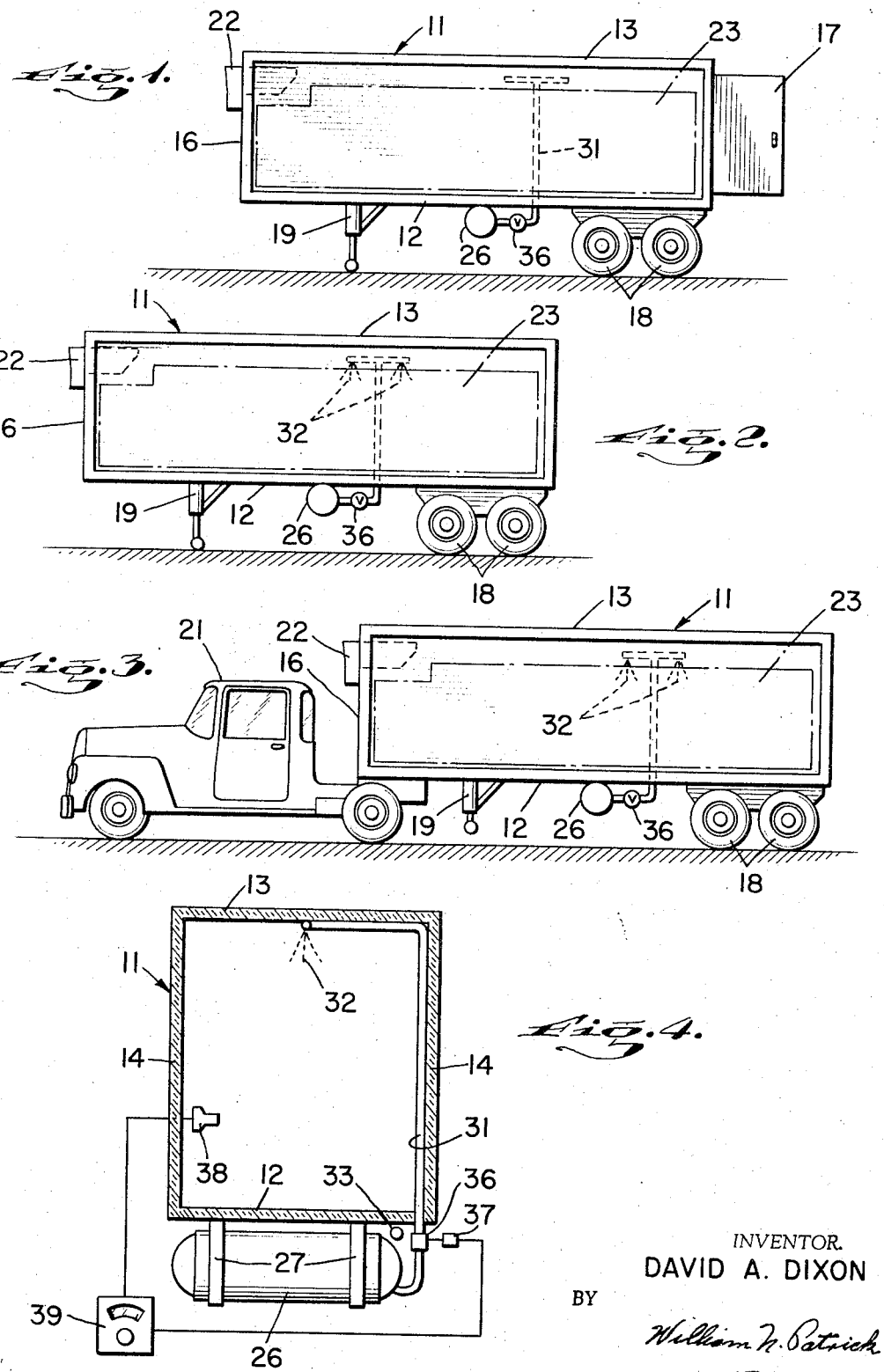
INVENTOR.
DAVID A. DIXON
BY
William N. Patrick
ATTORNEY.

Jan. 23, 1968

D. A. DIXON 3,365,307

METHOD FOR MINIMIZING DETERIORATION
OF PLANT AND ANIMAL PRODUCTS

Filed Jan. 10, 1966

INVENTOR.
DAVID A. DIXON

BY

William N. Patrick
ATTORNEY.

INVENTOR.
DAVID A. DIXON
BY
William N. Patrick
ATTORNEY.

United States Patent Office 3,365,307
Patented Jan. 23, 1968

3,365,307
METHOD FOR MINIMIZING DETERIORATION
OF PLANT AND ANIMAL PRODUCTS
David A. Dixon, San Anselmo, Calif., assignor, by mesne
assignments, to Occidental Petroleum Corporation, Los
Angeles, Calif., a corporation of California
Continuation-in-part of applications Ser. No. 356,624, Apr.
1, 1964, Ser. No. 420,564, Dec. 23, 1964, and Ser. No.
450,933, Apr. 26, 1965. This application Jan. 10, 1966,
Ser. No. 534,922
16 Claims. (Cl. 99—150)

This application is a continuation-in-part of my copending application bearing Ser. No. 356,624, filed Apr. 1, 1964, and now Patent No. 3,239,360, Ser. No. 420,564, filed Dec. 23, 1964, and now Patent No. 3,269,133, and Ser. No. 450,933, filed Apr. 26, 1965.

This invention relates to a new and improved method and apparatus for cooling, storing and transporting produce which includes both animal and plant matter that is subject to deteriorative degradation in the presence of oxygen. More particularly, the invention relates to a method and apparatus for reducing the degree of deterioration of produce in a given time period and also maintaining the produce substantially without spoilage during the interval that its temperature is being reduced, as well as thereafter. Produce that is to be either stored or transported can be treated in accordance with the method of this invention.

Animal matter as used herein includes meat, poultry, fish, fresh seafood, live seafood and products containing meat, poultry or fish. Non-limiting examples of plant matter include harvested fruits, vegetables, flowers and bare root plants, sometimes referred to herein as produce of the field. Non-limiting examples of other produce or food products matter which is subject to deteriorative degradation in the presence of oxygen include nuts, mushrooms, eggs, cheese, etc. Where specific commodities present special problems, they are referred to by name.

A principal economic loss occurring during transportation and/or storage of produce of the field, such as fresh fruits, vegetables and flowers, is the degradation thereof which occurs between the field and the ultimate destination attributable to the effects of respiration. Heretofore, a conventional attempt to reduce such degradation has been to refrigerate such produce to reduce the rate of respiration. A means heretofore employed has been precooling the refrigerator compartment. This, however, requires a source of ice or large refrigeration equipment. Another attempt to reduce degradation shortly after harvesting the produce, has been vacuum cooling which is accomplished by evacuating the compartment, thereby evaporating a portion of the moisture present in the produce and thus reducing the temperature of the produce. Vacuum cooling, however, requires a centrally located vacuumizing plant. The expense of precooling and vacuum cooling plants and the inconvenience, cost, and delay in transporting the produce to such central plant is eliminated by the present invention.

In the case of animal matter such as meat, poultry, and fish, it is conventional practice to preserve meat and poultry after slaughtering in a cold storage warehouse in order to reduce deterioration and spoilage by bringing the temperature down to a level of approximately 32° F. within a period of time which varies in different establishments. Commercially practical storage within such warehouses requires that meat and poultry carcasses be hung in fairly close proximity with consequent interference with cold air circulation which extends the period of time before the temperature is brought down to approximately room temperature within the warehouse. The delay results in deterioration from surface oxidation, color changes and decay. If forced cold air circulation is used to reduce the time for temperature reduction, then since the circulation of air over cooling coils results in condensation of moisture and hence reduction in humidity, the moisture content of the meat is reduced. This results in a detrimental appearance of the meat and also reduces the weight, and consequently the market value of the product is materially affected.

Heretofore, attempts to protect meat from evaporation of moisture by means of bags and covering have been unsatisfactory because a slimy coating appears on the meat which is extremely undesirable from a marketing standpoint. Such slimy coating rapidly brings about spoilage.

None of the above discussed prior art methods have been effectual in satisfactorily reducing deteriorative degradation of plant and animal matter.

It is therefore an object of this invention to provide a method and apparatus for retarding the deteriorative degradation of plant and animal matter to a degree that would not affect market value.

Another object is to provide a method of retarding the deteriorative degradation of plant and animal matter at temperatures above the freezing point of such matter.

It is also an object of this invention to provide a method and apparatus of retarding the deteriorative degradation of plant and animal matter in a temperature range which is between the temperature that the matter is placed in an enclosure and its freezing point, wherein, however, the matter is not permitted to freeze. Other objects of this invention will become more apparent from the discussion which follows:

A method of retarding the deteriorative degradation of plant and animal matter which is subject to such degradation in the presence of oxygen comprises reducing the oxygen content of the atmosphere which blankets such matter to a value within a range not to exceed about 5% by volume of said atmosphere but above the value at which anaerobic respiration would begin. Such reduction in oxygen concentration is accomplished usually within a time period such that there is substantially negligible deteriorative degradation of such matter during such time period. In order to realize maximum advantage from the reduction of the oxygen concentration, it should be reduced within about 120 minutes, it is preferred to accomplish the reduction in such oxygen concentration within about 60 minutes from the time of beginning such reduction of the oxygen concentration. When the oxygen concentration is reduced in this period of time, the deteriorative degradation of the matter within such period of time is substantially negligible. Ranges are periods of time of from about 10 minutes to about 30 minutes for the preservation of quality and appearance of the produce. The oxygen concentration may be reduced to the desired range over a still longer period of time as, for example, up to 180 minutes. Although the rate of deteriorative degradation over this period is slowly reduced and eventually brought to a minimum, it is preferable to reduce the oxygen concentration within a shorter period of time as discussed above. After the oxygen concentration has been brought within the desired range, it is maintained within that range for whatever period of time is desired to hold the rate of deteriorative degradation to a minimum.

The method of retarding the deteriorative degradation of matter which is subject to such degradation in the presence of oxygen, comprises first placing such matter in a container. If the container is otherwise air tight, it should be equipped with gas inlet and outlet means. However, most commercial containers are not airtight but are so constructed that they are adapted to the leakage of gases into and out of the container, so that the atmosphere can diffuse into and out of same. The matter, whether it be animal or plant matter as discussed above, is loaded into the container which is then closed and the prevailing atmosphere purged therefrom with a purge gas which substantially does not promote any deteriorative degradation and has an oxygen content less than a predetermined value which does not exceed five percent by volume. Preferably, the oxygen content of the purge gas is about ¼% or lower. The purging step is continued until the oxygen content in the cover atmosphere in the container is reduced to a value within a desired range. The desired oxygen concentration range is from about 5 percent by volume down to a value which is just above that at which anaerobic respiration would begin. The balance of the atmosphere is substantially inert. One method of accomplishing the purging is to use an inert gas such as nitrogen, argon, helium or neon. Nitrogen is of course more plentiful and is usually the gas that is employed for purging. However, helium and argon are also used for this purpose. The purging is effected within a time period such that there is negligible deteriorative degradation of the matter in the container during such purging period. The time of such purging will vary with the particular product in the container and with the temperature thereof. Some produce such as flowers, strawberries and other berries, as well as asparagus and ripe tomatoes, deteriorate quite rapidly in the presence of oxygen after having been harvested and the oxygen concentration in the atmosphere in the enclosure should therefore be reduced quite rapidly. Other products such as peaches, pears and cabbage do not deteriorate so rapidly and a longer period can be tolerated for the initial purging process. Also, the higher the temperature of the particular product that is placed in the enclosure, the faster the oxygen concentration should be reduced in order to minimize deteriorative degradation. After the oxygen concentration in the atmosphere has been lowered to the desired range, it should be maintained within that range for as long as it is desired to keep the deteriorative degradation at a minimum. This is accomplished by adding purge gas to the container during a second period of time following the initial purging of the enclosure at a much lower average rate, either continuously or intermittently, but nevertheless, in an amount sufficient to maintain the oxygen concentration within the desired range.

An embodiment of this invention is to sense the oxygen concentration in the container with an appropriate oxygen sensor, initiate the flow of purge gas to the enclosure when the oxygen concentration exceeds a predetermined value, and discontinue the admission of purge gas to the enclosure when the oxygen concentration falls below a second predetermined value.

In the case of plant matter, the oxygen concentration in the container can be reduced to a value just above the point at which anaerobic respiration would take place. In the case of freshly harvested vegetable and flowers such as lettuce, carnations, and the like, the oxygen concentration can be taken down to ¼ percent. In the case of fresh fruits, such as strawberries, and other berry crops, the oxygen concentration can be taken down to ½ to 1% oxygen. In the case of still other fresh fruits such as peaches, pears, oranges and asparagus, the oxygen concentration can be taken down to 1 to 2½%. In the case of nuts, such as walnuts, pecans and chestnuts, the oxygen concentration can be lowered to 0%, although ¼% is preferred.

In the case of bare root roses and trees, the oxygen concentration can be reduced to ¼–1%.

In the case of animal matters uch as slaughtered animals, poultry and fish, the oxygen concentration can be taken down to zero since there is no deterioration due to anaerobic respiration but only such deterioration as is due to chemical and microbiological activity. This is also true of eggs and dairy products such as cheese. In general, this is true of inanimate matter of animal origin. For economic reasons, however, it is preferrd to reduce the oxygen concentration to ½–¾%.

From the above discussion it is seen that the level of oxygen is preferably controlled at a certain percentage, which varies for different types of produce, but is generally in the range of 1% to 4%. For most produce the level is ¼ to 3% of $O_2$ and the balance nitrogen. Equipment commercially available will control oxygen level within plus or minus 0.1% of set point under ideal conditions. Inaccuracies in the total system, such as rate of diffusion of $N_2$ and $O_2$, purge convection currents, and the like, reduce accuracy under dynamic conditions to plus or minus ½% of set point; under static conditions to plus or minus ¼%. Green produce at 2% $O_2$ has a respiration rate of one-sixth that at normal atmosphere as contrasted with a respiration rate of one-third normal at 4%. For soft fruits, 3½% $O_2$ is best and at 1% the danger of anaerobic respiration is great. FIG. 10 is a graph showing effect of variations of $O_2$ level on rate of respiration of produce.

A feature of the invention is the fact that the oxygen level is not brought too low. If the oxygen in the atmosphere is below certain levels, anaerobic respiration causes serious degradation of the produce. Accordingly, it is a principal purpose of the present invention to so accurately control the amount of oxygen in the atmosphere that degradation is minimized either from oxidation (i.e., respiration) of the produce or from anaerobic action. Although it has been stated that nitrogen is used in accordance with the present invention, it will further be understood that other inert gases of which argon is a typical example, may be substituted or mixed. The gases are transported in containers at low temperatures and low pressure in liquid state. Insulation is employed to reduce the tendency to evaporate. Such insulation may be accomplished by the use of double-walled containers, such as Dewar flasks, or by thick layers of insulation.

With some produce, such as lettuce, which is relatively immune to damage from possible anaerobic respiration, oxygen level is sometimes controlled at some point set between ¼ and 1%, since microorganisms such as moulds, bacteria and decay-causing fungi will not grow in such an atmosphere. Usually a further characteristic of such produce is that it is harmed by even trace amounts of carbon dioxide.

In transporting certain produce, of which typical examples are strawberries and apples, the degradation is further reduced by addition of carbon dioxide to the atmosphere. Accordingly, due to its inhibiting effect on the growth of certain microorganisms, it is contemplated in accordance with this invention that small quantities of carbon dioxide can be introduced in addition to the nitrogen and other inert gases.

The container in which the plant or animal matter is placed can vary in size, shape, design and construction, depending upon whether it is to be used for storage or transportation or both, and also upon factors such as convenience and the amount of produce to be handled therein. In general, the container can be a semi-trailer, truck or railroad car, ships hold, barge container or any container suitable for the control of the oxygen concentration of the atmosphere therein which is loaded on any land, air or sea-going vehicle.

When the container is a storeroom, it is advisable to select the capacity of storeroom to correspond to the amount of either vegetable or animal matter or both, to be stored therein at any one time so as to avoid the necessity of opening the door to such storeroom for adding or subtracting products therefrom after the oxygen concentration has been lowered to the desired level, since the opening of the door allows the oxygen concentration to be increased above the desired level. Case should also be taken, with respect to humans entering such container, that the interior is opened to a supply of oxygen for a sufficient period of time to make the enclosure's atmosphere safe for human habitation so as to prevent possible asphyxiation.

The container can also be a carton, or a bag. For example, a carcass of beef or a portion thereof can be placed in a bag which is equipped with means for introducing a purge gas thereinto. If the bag is air tight, it would of course have to have a gas inlet and outlet means for efficient purging operations. Small containers such as bags, cartons, boxes, etc. constructed of conventional materials such as paper, wood, plastic and the like, both porous and non-porous are used for the handling of small amounts of animal and plant matter. When used according to the teaching of this invention, they are equipped with gas inlet means for purging purposes, and if such containers are gas-tight, they are also equipped with gas outlet means. When the source of purge gas is located inside the container, only gas outlet means need be provided. An advantage of small volume containers is that a number of them can be placed inside a larger container and the purge gas inlet means of each can be connected to a common purge gas header having a number of connector means thereon. A saving is effected in the amount of purge gas employed. Also, the opening of the door to the larger container does not disturb the controlled oxygen concentration within the smaller containers.

A type of container that is employed in the practice of this invention is a semi-trailer. Such semi-trailer can be loaded with fresh fruits or vegetables, etc. at the point where the produce is being harvested. After the semi-trailer is filled, the doors are closed and the excess oxygen purged therefrom with a suitable purge gas such as nitrogen, argon or helium. The trailer construction is generally such that air can diffuse in and out of same and no special gas outlet need be provided. However, if the trailer is of a gas-tight variety then suitable gas inlet and outlet means are provided in order to permit purging and subsequent control of the oxygen concentration. After the semi-trailer is loaded, it can be tractor hauled to point of destination over the highways, or loaded piggy-back on a flat car for rail shipment to its destination.

Animal matter such as meat, poultry and fish can be loaded in suitable containers at convenient points such as slaughter areas for example, the oxygen concentration reduced to the desired range and thereafter maintained in such range the enclosure taken to its destination where it is opened and its contents unloaded in a superior condition than if the oxygen had not been controlled within the said range.

It is to be understood that the above discussion with respect to the type of containers and the sizes thereof is for purposes of illustration only and is not to be taken by way of limitation.

An embodiment of this invention is to combine the controlling of the oxygen content of the atmosphere in the container within a desired range, with the step of reducing the temperature of the animal or plant matter contained in the container. As discussed earlier, elaborate methods have been devised in the past for the reduction of the temperature of animal and plant matter in order to get it to a point where spoilage and decay is minimized. However, in the presence of excess oxygen (that is, oxygen above the desired range as taught according to this invention) plant matter respires, giving off heat, which makes it more difficult to reduce its temperature. The respiration is accompanied by deteriorative degradation of the plant matter. Reducing the oxygen concentration to the desired range, substantially arrests respiration and therefore reduces deteriorative degradation to a minimum. Since the plant processes due to respiration are minimized, the heat given off by the plant is also minimized and it is easier to bring the temperature of the produce down. Furthermore, since respiration has been minimized by decreasing the oxygen content in the enclosure, the temperature can be reduced at a slower rate. For example, plant matter can be loaded into an enclosure at a temperature of 70 degrees F., the oxygen concentration in the atmosphere reduced to the desired range and then the temperature reduced gradually over a period of 5 weeks to 40° F. At the end of this time, it is found that the plant matter had sustained far less damage from deteriorative degradation than when the temperature had been lowered by prior art methods and stored in air or atmospheres in which the oxygen concentration had not been controlled within the desired ranges as taught in this invention.

The temperature can be reduced with the aid of refrigerating apparatus en route as in the case where fresh fruits and vegetables are shipped in semi-trailers or other suitable containers in which the oxygen concentration is controlled as herein described and the temperature is slowly reduced by refrigeration equipment on such semi-trailers. Because the temperature need not be reduced rapidly, the refrigeration equipment can be of low capacity, thereby providing an economic advantage over shipping produce in refrigerated containers in which the oxygen concentration is not controlled according to the process of this invention.

In a similar manner, animal matter as for example meat, poultry and fish as well as meat-containing products, poultry-containing products and fish-containing products are placed in containers in which the oxygen concentration is controlled within the desired range and the temperature then reduced from the temperature at which such animal matter is placed in the enclosure, down to its freezing point, but excluding the freezing point. It is desirable not to freeze animal matter and processed products containing animal matter which is stored or transported according to the teachings of this invention, in order to maintain its appearance and flavor. For example, slaughtered beef, pork, lamb or poultry is loaded into a container, the doors closed and the oxygen concentration therein lowered to the desired range by means of a purging gas as described hereinabove, and then the temperature of the animal matter is reduced over a period of time. When the container is later opened, and the animal matter removed therefrom, it is found to have sustained no color change and is generally in better condition than similar animal matter which had been subjected to reduction in temperature by prior other methods but without the control of oxygen in the atmosphere in the container as taught herein.

A feature and advantage of the present invention is the use of equipment permitting the gases to be carried in liquid form, thereby maintaining the weight and cost of the equipment at a minimum while providing enough gas capacity to emit the large quantities of gas initially required to purge the compartment, as well as to emit lesser quantities of gas over a prolonged period of time while the compartment is being transported to maintain the oxygen level low.

Another feature of the invention is the provision of oxygen and carbon dioxide measuring and level-controlling devices which are rugged and accurate. Such controls may be powered by the gas pressure in the unit and suppplemented by small batteries for electrical controls which have a long life. Thus, the equipment is essentially self-contained and there is considerable portability between different compartments.

In the preferred form of the apparatus hereinafter described, the equipment, and particularly the nitrogen tank, is carried externally to the refrigerated compartment or container and thus does not occupy cargo space. As a safety feature, the safety pressure valve of the nitrogen tank is preferably vented to the outside of the compartment, thereby reducing the extreme danger to personnel which arises when the tanks are transported inside the compartment and the oxygen level has been reduced below safe conditions for humans by escape of nitrogen through the pressure relief valve. A further safety feature is the use of an oxygen analyzer with a visible indicator gauge which warns if the compartment is below a safe oxygen level.

Another feature of the invention is the provision of a gas supply sufficient to purge the compartment together with control equipment for the emission of such gas which permits a wide variation in purge rate and thus enables a proper atmosphere to be established very rapidly. Further, this system makes practical the use of the invention on substantially all existing produce-hauling trailers, containers and rail cars, without expensive modification, even though they have widely varying air leakage rates. Accordingly, the present invention can reduce the oxygen level set between ¼% to 5% within a ten-minute period after the cargo has been loaded into the compartment and the doors closed. Hence, the decomposition of the produce occurs at full rate only during a portion of such ten-minute period and is thereafter greatly inhibited. After the initial purging, the gas supply and the control equipment maintain the oxygen level carefully by a reduced flow of nitrogen. The equipment and controls are such that the ratio between the purge rate and the transportation rate of emission of the nitrogen is about 500-to-1. However, this can be varied from a ratio of about 4-to-1 to a ratio of about 2000-to-1.

The present invention has had outstanding results in improvement in the condition of produce after transportation and for storage. When oxygen level has been maintained in the range of ½% to 4% and the temperature of the compartment has been brought down and maintained in the range of about 50° to 33° F., produce stays fresh and edible up to ten times as long when conventional transportation methods are employed. The rate of decline of sugar content, tenderness and fresh appearance of the produce is likewise greatly decreased. Thus the market value as well as the shelf life of the produce after delivery are greatly enhanced. Conversely, where the oxygen in the atmosphere is reduced to the levels indicated, perishable produce may be transported under conditions of up to 30° F. higher than under conventional conditions of transport and storage, for periods of up to three weeks without experiencing as much deleterious degradation due to respiration as occurs normally in air under conventional low temperature holding conditions. Accordingly, the present invention provides a cure for the major causes of loss of market value of plant and animal matter produce between the field or slaughter house and the terminal market. The invention eliminates the need for many of the steps of rehandling now necessary between field or the slaughter house and the beginning of transportation. It will be understood that much degradation takes place during such rehandling and hence the present invention has a further benefit in the market value of the produce.

An example of novel equipment that is used with the present invention is described below with reference to the accompanynig drawings in which similar characters of reference represent corresponding parts in each of the several views.

In the drawings:

FIG. 1 is a schematic view of a trailer compartment or container, with door open for use in practising the method of this invention at the time of loading cargo.

FIG. 2 is a view similar to FIG. 1, after loading with door closed.

FIG. 3 is a view similar to FIG. 1, showing a tractor hitched to the compartment.

FIG. 4 is an enlarged corss-section through the trailer.

Figure 5:
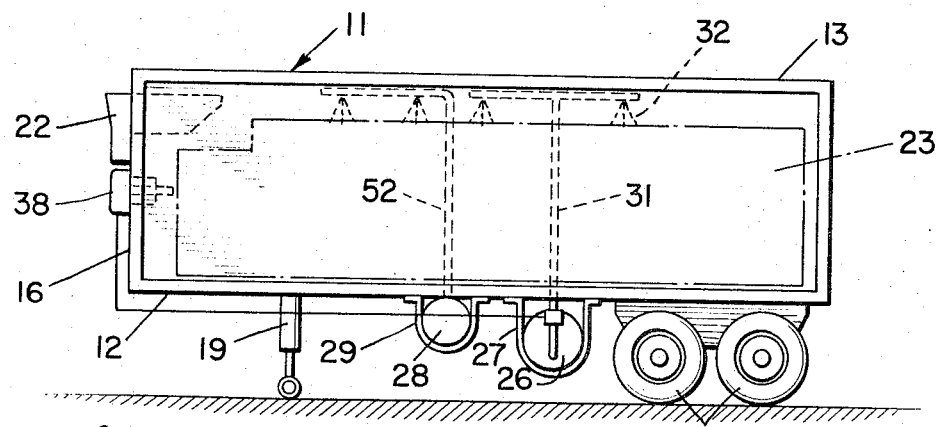
FIG. 5 is a view similar to FIG. 4, of a modification using CO₂ in addition to inert gas.

The equipment illustrated in the accompanying drawings is schematic and is subject to considerable variation. Essentially there is provided a cargo compartment or container 11, having a floor 12, roof 13, sides 14, and front end 16. The rear end is preferably closed by doors 17, but doors may be located on the front or sides. Although compartment 11 may be stationary (as for storage) or may be in the form of a lift van, nevertheless, a common form of compartment is a trailer of the highway type having wheels 18 and retractable support 19, and which may be moved by a tractor 21 or transported "piggyback" on railway equipment, or "fishy-back" on ships. Preferably, the sides 14, ends 16, 17, floor 12, and roof 13 are insulated to reduce heat transmission. When compartment 11 is a highway trailer, the preferred equipment uses a conventional highway-type refrigerator having a compressor and condenser 22 installed at the top of front end 16. It will be understood that other mechanical means may be used for refrigeration and other refrigeration means, such as ice or gas evaporation may be used.

Produce, such as crates 23 of fresh fruits and vegetables, is loaded into compartment 11 in normal manner and doors 17 are closed.

In accordance with the present invention, one or more tanks 26 of liquid nitrogen or mixtures of nitrogen and other gases, such as argon or helium are used. Tank 26 is supported by brackets 27 extending below floor 12, so that tank 26 extends transversely or longitudinally below floor 12. An auxiliary tank 28 of carbon dioxide may be similarly supported by brackets 29 (FIG. 5) and used where the presence of such gas in the atmosphere is desirable, as in the transportation of fruits. Tank 26 is, of course, pressure and shock resistant and adapted to the storage of liquified gases. A pipe 31 runs from tank 26 into compartment 11, preferably to a central location near roof 13 and a plurality of spray holes 32 is formed in pipe 31 so that the liquid rapidly evaporates after emission. Tank 26 is equipped with a safety pressure relief valve 33 which vents gaseous nitrogen to the outside when pressure exceeds a safe level for the strength of tank 26.

Figure 8:
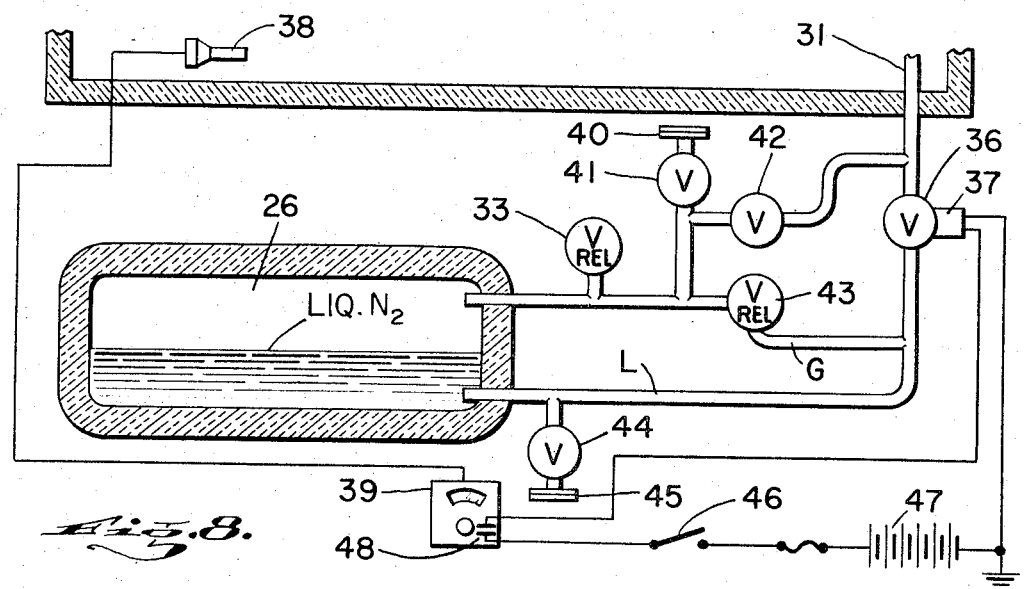
FIG. 8 is a conduit diagram of one form of system used with the container of FIG. 1.

The valving equipment of tank 26 is likewise subject to considerable variation. As shown in FIG. 8, regulator valve 36 in pipe 31 is controlled by a valve control means such as a solenoid 37. Mounted in the interior of the compartment is an oxygen sensing means 38. This can be a commercially available type of equipment which is responsive to the percentage of oxygen in the atmosphere to which it is subjected within narrow limits around some set point chosen on meter 39, between 0% and 5%. Sensor 38 may be a Beckman polarographic oxygen analyzer, Model 764 (modified), as made under Patent No. 2,913,386. By means of a relay, or directly through mechanical or electrical connection, sensor 38 controls valve control means 37. Normally, valve 36 is closed. It is opened only for short periods to permit the emission of nitrogen into the container.

In the system shown in FIG. 8, tank 26 is filled through valve 44 with all valves shut except 44. Excess gas pressure reaches 45 p.s.i.g. Vent valve 41 and vent fitting 40 may be used to remove some or all gas from the system or allow faster filling. When the system is turned on by switch 46, an oxygen level reading on meter 39 above set point will close meter-relay 48, activating valve control means 37, opening valve 36, allowing nitrogen to flow up tube 31 to distribution header 32. Before liquid nitrogen will flow, pressure in the tank must be relieved to 20 p.s.i.g. by back-pressure regulating valve 43. This valve 43 opens whenever pressure upstream exceeds 20 p.s.i.g. and closes whenever upstream pressure falls below 20 p.s.i.g.; its regulation is independent of downstream pressures, thus providing a true economizer circuit. Thus, until valve 43 closes, gas alone from tank headspace, will flow through tube G to valve 36; after pressure in the tank has been reduced to setting of valve 43, which is considered the working pressure of the system, and valve 43 closes, then liquid nitrogen flows through tube L when so called for by the opening of valve 36. Since constant evaporation of liquid nitrogen is occurring within tank 26 due to heat leakage from the outside, this economizer circuit assures that vaporized gas will always be constructively utilized within the atmosphere control system rather than wasted through relief valve 33. Since in a moving, and thus sloshing, tank, head space pressure will build up no faster than the entire bulk of liquid remaining in tank 26 can be brought to equilibrium condition regarding pressure and temperature, considerable "stand-by" time is possible with this economizer circuit, during which no gas will be lost by relief through valve 33.

If at the time that tank 26 is being filled with nitrogen, produce 23 has already been loaded into compartment 11 and doors 17 have been closed purge valve 42 is opened instead of vent valve 41 during the filling period, and gas that would normally be lost during the filling process is utilized instead for the initial purge of compartment 11. When filling of the tank is completed valve 42 is closed and valve 36 controls thereafter.

Tank 26 can be filled through valve 41 and fitting 40 instead of valve 44 and fitting 45 if filling equipment of suitable pressure handling capability is available, and in this case valve 42 is left closed.

Figure 9:
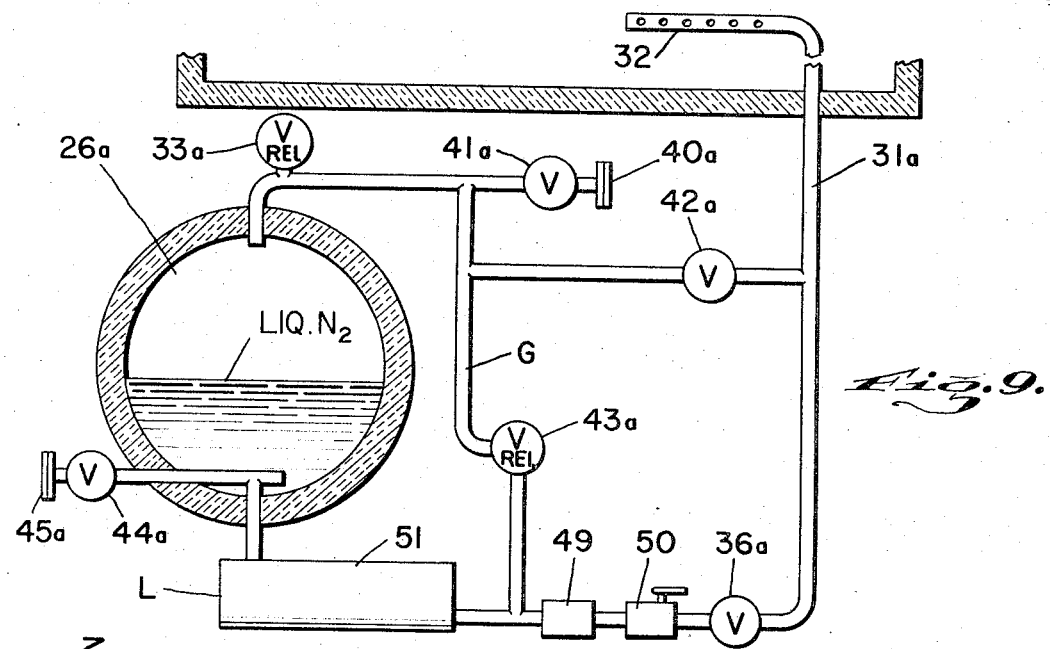
FIG. 9 is a diagram of an alternate conduit system.
Figure 10:
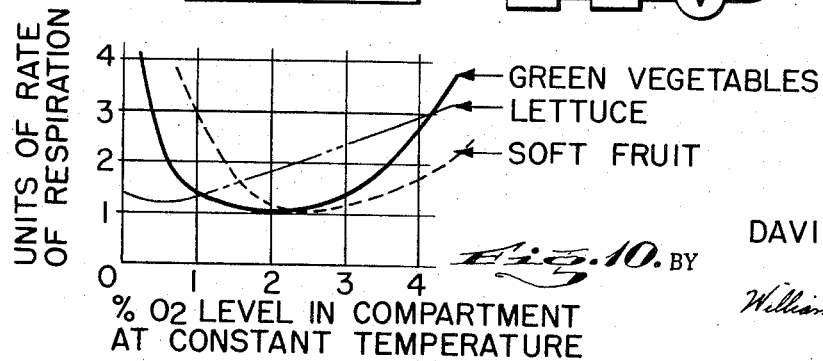
FIG. 10 is a graph showing, for different kinds of produce, rate of respiration plotted against oxygen level at constant temperature.

An alternate valving system shown in FIG. 9 uses an adjustable orifice 50 in line 31a which is adjusted to a size such as to maintain the oxygen level in compartment 11 under normal operating conditions at the desired percentage.

FIG. 9 is similar to FIG. 8 in operation, except that all nitrogen flowing towards nitrogen flow control valve 36a, which in this case also serves as the on-off control valve, arrives in gaseous form, and thus all nitrogen flowing up tube 31a and out of distribution header 32 is in gaseous form. Flow is controlled by an orifice 50, chosen so as to give constant flow sufficient to keep oxygen level within 1% of set point in the compartment, i.e., if 2½% oxygen level is desired, then orifice 50 is chosen to give a constant flow rate so that, under the leakage conditions present when using the specific container (compartment) on which this specific system is mounted, oxygen level will stay within the limits of 1½% to 3½%. It is thus a less sophisticated system than the one of FIG. 8, but it is simpler. Initial purge is accomplished by opening purge valve 42a during filling of tank 26a, which filling is normally designed to take place after plant or animal matter or other produce has been loaded into container 11 and doors 17 have been closed. If, however, the tank has been filled in advance of loading the container with produce, and pressure in tank 26a has during the interim period of time built up to the pressure of the relief valve setting, valve 33a (which in the case of FIG. 9 is set at 60 p.s.i.g. instead of 45 p.s.i.g. as with FIG. 8), the rapid flashing or vaporizing of liquid nitrogen in tank 26a that takes place when the pressure is lowered by opening valve 42a will provide a rapid purge, albeit manually accomplished, of the container with the expenditure of about 10% of the total capacity of tank 26a. A slower but automatic purge is accomplished by the fact that if 60 pounds of gas pressure, or some lesser amount down to 20 p.s.i., is applied against orifice 50, the flow rate is greater than that necessary to maintain steady state condition within the container or compartment. Thus, the same pressure relief phenomenon occurs down to the set pressure of valve 43a, as occurs in the manual purge using valve 42a above, but more slowly. Corresponding parts of the system have the same reference numerals as in FIG. 8, followed by a subscript a.

An embodiment of this invention is the use of a vaporizer circuit 51 consisting of tubing, providing heat exchange between ambient air and liquid nitrogen to insure that all nitrogen reaches orifice 50 in a gaseous condition. A strainer 49 protects orifice 50 against being plugged by foreign particles.

An embodiment of this invention is the employment of the apparatus shown in FIG. 9 for rapidly purging the oxygen from the container as described above and thereafter maintaining a constant flow of nitrogen through the orifice 50, together with an oxygen sensing means in the container which operates a port means to allow ambient atmosphere (which contains about 20% oxygen) or other oxygen-containing gas, to enter the container whenever the oxygen concentration in the container falls below a predetermined first level. The port means may be a small door means equipped with door actuating means for opening and closing thereof or such port means may consist of an inflatable gasket means around the doors or a balloon within a small tubular opening running between the inside and the outside of the container. The sensing means is adjusted such that when the oxygen concentration falls below a predetermined first level the sensing means actuates the port actuating means. If the port means is a door means, then the actuating means causes same to open. If the port means comprises an inflatable means around the loading door, for example, or a balloon then such inflatable gasket or balloon is deflated to permit air to enter the container and thereby increase the oxygen concentration in the container. When a predetermined second level set on the sensing means, the port actuating means is again put in motion to either close the small door or cause the inflatable gasket or the balloon to be inflated, thereby interrupting the admission of the oxygen into the interior of the container. The inflation and deflation of the inflatable gasket means or a balloon is accomplished, for example, by the turning of a valve in a conduit leading from the inert gas storage means to the inflatable gasket means, permitting the purge gas to inflate it or, in another position of the valve, permitting gas to be exhausted from the inflatable gasket means or the balloon. This method has the advantage that there is a constant purge rate, that is, there is a constant flow of purge gas into the container and, therefore, because of the construction of the container, a small amount of gas is continuously escaping therefrom, providing a flushing action and thereby preventing the build-up of undesirable gases such as $CO_2$ which may be liberated by the produce. When, however, the oxygen concentration falls below the desired level, additional oxygen is admitted into the container to avoid such deleterious processes as anaerobic respiration to take place.

In an embodiment of this invention in the case where the produce, consisting of either animal or plant matter or a mixture of both, is contained in small, easily handled containers such as bags, cartons, boxes, metal containers, and the like, the pipe or conduit means 31 inside the large container 11 is modified to provide a header or manifold means to which the inlet means of each of the small containers is connected so that the interior thereof can be purged with the purge gas and thereafter purge gas admitted either continuously or intermittently to maintain the oxygen concentration at the desired low level. Another embodiment of this invention is the modification wherein each of the small containers is equipped with an inlet gas valve means and an oxygen sensing means operatively connected to control the valve means. This embodiment in effect provides individual small containers equipped with atmosphere control means. When a plurality of such small containers with individual sensing and control means are connected to a common manifold, such individual sensing and control means replace the sensing and control means for the larger container, whether stationary or moveable. There is thereby provided an adequate pressure of purge gas in the manifold to service each of the plurality of small containers. Refrigerated air is circulated around the individual containers to remove heat. The rate of cooling and the final temperature is controlled by conventional means.

Figure 6:
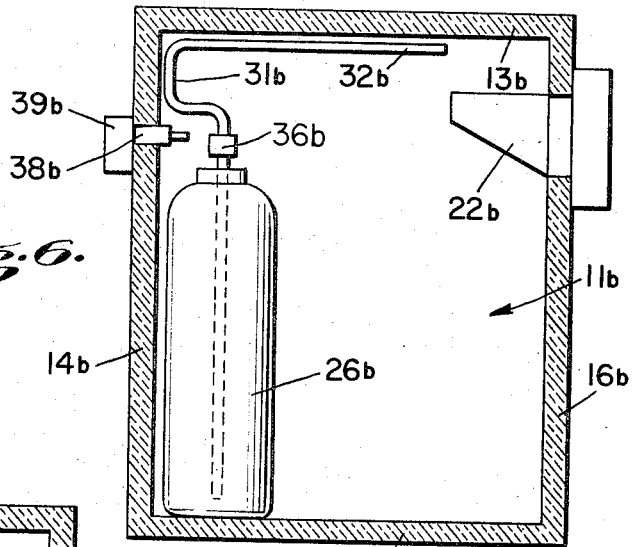
FIG. 6 is a view similar to FIG. 4 of a modified system.

In the modification of FIG. 6, tank 26b is mounted inside the compartment 11b. Other elements of the system are designated with the same reference numberals as in the preceding modification followed by the subscript b.

Figure 7:
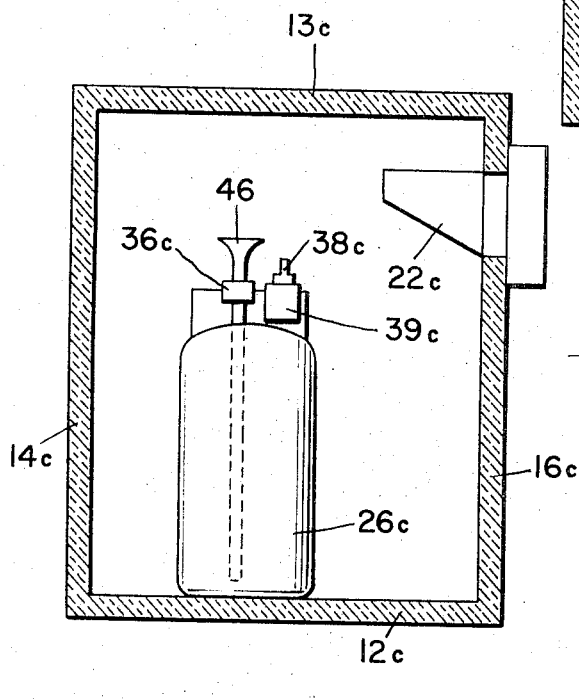
FIG. 7 is a view similar to FIG. 4, of a further modified system.

Still another modification is illustrated in FIG. 7, where an oxygen sensor 38c and control equipment, as well as an emission nozzle 46 of the spray type, are installed on the top of tank 26 itself. The unit is thus self-contained and may be installed and removed rapidly. Other elements of this modification are similar to those shown in FIG. 6 and corresponding parts are marked with the same reference numerals followed by subscript c.

The control equipment by which sensors 38, 38b and 38c regulate valves 36, 36b, 36c can be actuated by a battery or the vehicle electrical system, by a combination of a small battery and pneumatic operation pressured by the gas in the container, or by a mechanical linkage between the oxygen sensor and valve 36. When electrical means are used, a relay can be employed in the control equipment.

At the commencement of operation, container 11, whether warehouse or large or small individual container, contains air which has an oxygen percentage of about 20%. The temperature of the atmosphere in compartment 11 is that of the ambient atmosphere or field temperature. The temperature of the cargo 23, produce which is loaded into compartment 11, can be at the temperature of the ambient atmosphere or at either higher or lower temperatures. After loading, doors 17 are closed. Commercial containers, such as semi-trailers for example, are usually not airtight.

After the produce has been loaded, the nitrogen tank main valve 36 is opened. Sensor 38 senses excess oxygen and opens regulator valve 36 rapidly emitting into compartment 11 a large volume of nitrogen as gas or as a liquid which rapidly vaporizes into gas and which is approximately seven or eight times the total volume of the remaining airspace in compartment 11. The nitrogen rapidly diffuses throughout compartment 11, containers 23 containing the produce, and around and into the produce itself. It will be noted that this is a diffusion action and that convection is not essential to the operation. The emission of such a large initial volume of nitrogen into the compartment "purges" the atmosphere of air by dilution and expulsion, bringing the oxygen content down to the desired set point or value between 0% and 5%. Preferably, this is accomplished within a time period of about thirty minutes. It is especially preferred to accomplish the initial purging within about ten minutes. Vaporization of such a large quantity of liquefied nitrogen accomplishes a certain amount of refrigeration of the container, but such refrigeration is incidental to the process of this invention.

After the purging of the container, oxidation of the produce due to respiration is greatly reduced and hence the rapid loss of quality of the produce through such initial degradation is limited to the time period of the purge which is nearly always sufficiently short that no commercial value is lost.

After the initial purging of the container, it can be transported long distances during time periods of relatively long or short duration either by tractor 21 or by railway equipment, or other means heretofore mentioned. Preferably during such transportation, mechanical or refrigeration equipment 22 is operated which reduces the temperature inside compartment 11 to some extent. A cargo temperature range of 33° to 35° is suitable for most products and this is usually attained over a period of 12 to 72 hours.

Some products, such as lettuce, have longest market shelf life if carried at higher temperature, such as 60° F. Produce, the temperature of which has been lowered after it has been harvested or slaughtered or after it has been prepared as in the case of meat products, cheese, etc., can also be handled according to the method of this invention since reducing the oxygen concentration in the atmosphere which blankets the produce substantially decreases further deteriorative degradation caused by the presence of oxygen. Soft fruits, for example, can have their temperature reduced prior to loading in a container and reduction of oxygen concentration in the atmosphere.

Ice can be the additional refrigerant and in many cases today, particularly when compartment 11 is a railway car, ice is still used to refrigerate produce in transit. When the atmosphere control device is used in conjunction with the ice refrigeration, two of the great disadvantages of ice refrigeration are overcome; (1) much less ice is used, since in the usual produce haul the heat of respiration, even of a precooled load of produce of the field is often three to six times that of the heat that enters from outside the container due to ambient conditions, and (2) the corollary effect—that of having to stop a train nightly for reicing—is avoided, since one loading of ice at destination will hold the load and handle the remaining refrigeration load all the way to destination in many cases. It can be seen that the effect of (1) is that of greatly decreased cost, since the cost of ice is quite high today compared to what it was when ice cars were first developed; the effect of (2) is not only the inherently lesser cost of using less ice but also the tangible and considerable saving accomplished by not having to stop a train every night of a six-day journey to spend three to six hours reicing all of the cars.

As the transportation or storage of the produce continues, there is a certain amount of leakage of air from the exterior into compartment 11 and, also, certain gases are emitted by the produce. The oxygen sensor 38 senses the presence of oxygen in excess of the percentage composition or range of compositions at which the control equipment is set to maintain the oxygen level, and whenever such percentage or percentage range is exceeded, an additional quantity of nitrogen is released into the compartment to diffuse through the atmosphere and bring the oxygen level down to within the desired range. The quantity of nitrogen normally released in this manner after the initial purging is relatively small, and hence a tank 26 of liquid nitrogen, or other inert gas, will satisfy all normal requirements for transportation for long distances and over prolonged periods of time, such as two weeks or more.

In the case of produce of the field, sensor 38 maintains the oxygen level in container 11 during transportation about ¼%, or other level, depending on the particular product involved, so that anaerobic degradation of the produce is not initiated.

The following non-limiting examples illustrate the method of this invention.

EXAMPLE I

Into a container of the type which was subject to the diffusion of gases thereinto and therefrom as described hereinabove and in FIGURES 1–3, and equipped with an oxygen control system as also shown in FIG. 8, there were loaded crates of lettuce. When the loading into the container was completed the door was closed and controller 39 (FIG. 8) set to control the oxygen concentration in the container at 1±0.1%. Switch 46 was then closed, connecting the control system to source of power 47 which in this case was a battery. Valve control means 37 immediately opened valve 36 and nitrogen, from the liquid nitrogen container 26, flowed into the container 11 for a period of about 30 minutes at the end of which time the oxygen concentration in the container had been reduced to 1%±0.1% in the atmosphere in the container, as sensed by the oxygen sensor 38 and the control equipment closed valve 36. During the first 10 minutes of the purging operation, the oxygen concentration was reduced to about 5% in the atmosphere in the container. During this time period an amount of liquid nitrogen evaporated from the container 26 equivalent at conditions of standard temperature and pressure to about seven times the volume of the container 11 in which the lettuce was stored. The commercial refrigeration equipment in the container was then actuated and the temperature reduced from a temperature of 80° F. at which the lettuce was loaded into the container to 35° F. over a period of about 72 hours. The operation of the equipment is also described elsewhere in this writing. The container was transported to its final destination over a period of 11 days. During the transportation period, the oxygen control apparatus functioned as described hereinabove by the intermittent admission of nitrogen into the container, to maintain the oxygen concentration therein at substantially 1±0.1%.

Upon reaching the destination, the doors to the container were opened and the crates of lettuce unloaded. There was substantially no deterioration degradation.

Equally good results are obtained when green beans, strawberries, green peas and sweet corn are handled in the manner described in Example I.

EXAMPLE II

A shipment of lettuce was made employing the method described in Example I with the modification that the container was adapted for shipment on a sea-going vessel. The oxygen concentration in the container was maintained at 1±0.1% after initial purging which was accomplished within about 25 minutes. The refrigeration equipment on the container reduced the temperature therein from about 60° F. (temperature at which the lettuce was loaded) to about 35° F. over a period of about 72 hours. Upon reaching the destination six weeks later, it was found that there was no deteriorative degradation. Examination showed that there was less than about 5 percent of the outer leaves of the lettuce that showed any sign of deteriorative degradation. This is to be compared with the transportation of lettuce in the same period employing conventional methods of refrigeration but without controlling the oxygen concentration in the atmosphere in the lettuce container, in which case it was found that 75% of the lettuce had to be discarded as unfit for consumption.

EXAMPLE III

The method of Example I is repeated with a shipment of plums with the modification that the oxygen concentration is reduced to and maintained at about 5%. The reduction in the oxygen concentration is accomplished over a period of about 180 minutes. A temperature of about 60° F. at which the plums are loaded into the container is reduced to about 37° over a period of about 48 hours. Upon arrival at destination, about two weeks later, it is found that there was substantially no deterioration of the plums.

When the method of Example II is repeated with the modification that the oxygen concentration is reduced to and maintained at 4%, good results are obtained.

When the procedure of this example was repeated with the modification that the oxygen concentration was reduced to about 3% in about 30 minutes, and the temperature reduced from about 70° to about 35° F. over a period of about 96 hours, the produce, upon being stored in this atmosphere for 2 weeks, exhibited negligible deteriorative degradation.

EXAMPLE IV

The procedure of Example I was repeated in the storage of lettuce in a stationary container with oxygen concentration being reduced to about 0.25% in about 40 minutes and the temperature reduced from 55° F. to just above the freezing point over a period of five days. The rate of initial purging with nitrogen during a first time period, was about 500 times the average rate at which nitrogen was admitted into the container to maintain the desired oxygen concentration during the second time period. At the end of ten days, during which time the oxygen concentration was maintained at substantially 0.25%, the produce showed substantially no deterioration.

The method of this example was applied to the storage and transportation of spinach, cauliflower and lettuce of the romaine, endive and water-cress varieties. The oxygen concentration in different instances varied from ¼% to 4% with the result that when kept in the oxygen reduced atmosphere for about one week there was substantially no deteriorative degradation.

EXAMPLE V

The procedure of Example I was followed in the storage and shipment of tomatoes. The tomatoes were loaded into a container at a temperature of about 80° F. The oxygen concentration was reduced to about 1.5% by purging with nitrogen over a period of about 20 minutes and thereafter maintained at substantially this oxygen concentration. The temperature was reduced to about 45° F. over a period of about 60 hours.

Upon removal from the container after three weeks, there was found to be substantially no deteriorative degradation of the tomatoes.

EXAMPLE VI

The method of Example V was repeated with the modification that the oxygen concentration was reduced to and maintained at substantially 1.7% by purging with a mixture of nitrogen and argon. The temperature of the tomatoes was reduced from about 60° F. to about 50° F. in about 36 hours and thereafter maintained at this value. After 10 days during which time the oxygen concentration was maintained at substantially 1.7%, upon removing the tomatoes from the compartment, it was found that there was substantially no deteriorative degradation.

EXAMPLE VII

The method of Example I is repeated with the modification that the produce comprising lettuce, asparagus, strawberries, peas, green beans, sweet corn and cauliflower is packaged in small, convenient-to-handle containers. The manifold means has a plurality of outlets for connection to gas inlets, with one of which each of the small containers is equipped. The valve 36 in FIG. 8 is fixed in an open position and each of the individual small containers have a valve on the inlet means thereto. An oxygen sensor 38 is contained in each of the individual small containers and controls the valve on the inlet means in such container. The inlet to each container is connected to an outlet on a manifold. Some of the containers are covered with plastic and are therefore equipped with gas outlet means. Others of the individual containers are of the type which permit the diffusion of gases thereinto and therefrom.

When all the individual containers are connected to the manifold, the oxygen controlled apparatus is connected to the source of power as described in this application and nitrogen is then permitted to flow through the valves in the gas inlet means on each of the small containers. In this manner, the oxygen concentration in each of the containers is reduced to about 1% with the exception of the one containing the tomatoes in which the oxygen concentration is reduced to about 1.6%. The reduction in the oxygen concentration is accomplished in about one minute by a flow of nitrogen into the small containers at a rate of about 2000 times the average rate at which nitrogen is admitted after the initial purge to maintain the oxygen concentration at the desired low level. Thereafter the oxygen concentration is maintained at such levels by intermittent flow of purge gas into the individual containers as required by the oxygen sensing system in each. The temperature of the produce in the various containers is reduced from about 70° F. to about 45° F. by circulating refrigerated air around the individual containers. After fifteen days, the produce is removed from the individual containers and found to have suffered substantially no deteriorative degradation.

EXAMPLE VIII

The method of Example I was repeated with the modification that the oxygen concentration was reduced over a period of about 60 minutes. After ten days during which time the oxygen concentration in the container was maintained at the reduced level, it was found that there was substantially no deteriorative degradation.

EXAMPLE IX

The method of Example I is repeated with the modification that the oxygen control apparatus shown in FIG. 9 is employed in place of the oxygen controlling apparatus of FIG. 8. The orifice 50 is adjusted to provide a constant flow of nitrogen purge gas containing less than ¼% oxygen, into the container at a rate such as to maintain the oxygen concentration in the atmosphere in the container in the range of from ¼% to 4% after initial rapid purging to bring the oxygen concentration down to within this range. The setting of the orifice is based on the knowledge of the characteristics of the container with respect to the leakage of the gases therefrom under loaded conditions. At the end of five weeks the lettuce is removed from the container and found to have substantially no deteriorative degradation.

The apparatus functions equally well when the methods of Examples II–VIII are repeated using the apparatus of FIG. 9 in place of the apparatus of FIG. 8.

EXAMPLE X

The method of Example I was followed in the storage and transportation of carnations which had been harvested. The cut flowers were placed in the container at a temperature of about 68° F., the doors closed and the oxygen concentration in the atmosphere in the container reduced to about ½% ±¼% oxygen in about 15 minutes. The temperature in the container was reduced by refrigeration method at the rate of about ¼°–1° F. per hour until the temperature had reached about 33° to 35° F. The flowers were maintained in this atmosphere and at this temperature for a period of four weeks. On removal from the container there was found that the life, fragrance and appearance of the flowers was substantially the same as when placed in the container four weeks earlier.

Equally good results are obtained when the method of this example is employed for the storage and transportation of roses, stocks, chrysanthemums and other cut flowers.

EXAMPLE XI

The container described above and shown in FIG. 9 is employed together with an oxygen sensing means of the type described in this application and shown in FIG. 8. However, the container is modified to include port means adapted to be opened to permit ambient atmosphere containing about 20% oxygen to diffuse into the interior of the container. The oxygen sensing means is operatively connected to an actuating means which actuates such port means. The container of the type described in this application is loaded with lettuce at a temperature of about 60° F. The doors are closed and the air is rapidly purged from the interior of the container with nitrogen from the liquid nitrogen container 26a by opening a valve 42a (see FIG. 9). The oxygen concentration is lowered to a value within the range of ¼%–4% as shown on the indicator of the sensing means. The valve 42a is then closed. Orifice 50 is then set to provide continuous flow of nitrogen into the container at such a rate that there is a constant flow of gas out of the container. This serves to carry from the container any undesirable gases such as $CO_2$ and the like.

The nitrogen employed is of a commercial grade and contains less than ¼% oxygen. When the oxygen concentration drops below ¼%, as sensed by the sensing means, the sensing means actuates the port actuating means (a small door in the side of the container in this case) causing the port means to open. Oxygen from the ambient atmosphere diffuses into the enclosure until the oxygen concentration reaches the value of 1% at which time the sensing means closes the port actuating means to close the port means. The nitrogen from the storage tank continues to flow into the container and when the oxygen from the container has again been reduced to ¼%, the above described cycle is repeated. The temperature in the container is reduced by the refrigeration means at the rate of ¼°–1° F. per hour until the temperature of 50° F. is reached and the temperature thereafter maintained at this value. At the end of 8 days the lettuce is removed from the container and found to be in substantially the same condition as when placed in the container.

The method of this example is repeated with the modification that the port means on the container comprise an inflatable gasket means or balloon in a tube means of the type described elsewhere in this writing. Equally good results are obtained with lettuce and other vegetables when shipped and/or stored in such a container.

EXAMPLE XII

Lettuce at a temperature of 60° F. is loaded into a container of a type which is subject to diffusion of gases thereinto and therefrom as described in this application and shown in FIGS. 1–3 and equipped with an oxygen control system as shown in FIG. 8. The doors to the container are closed and the oxygen purged from the container with nitrogen as described in Example I until the oxygen concentration has been reduced to about ½%, the value at which the sensing control means is set. The purging operation is accomplished in a period of about 45 minutes. The container is then transported to its final destination point over a period of 8 days during which time the oxygen concentration is maintained at ½ ±¼%. When the lettuce is unloaded at its destination, it is found to have better life in its leaves, better sugar content, less disease growth on its leaves, less color change and less surface oxidation than another load of lettuce which had been shipped for the same period of time in a conventional refrigerated container at 37° F. but under a blanket of ambient atmosphere containing about 20 percent oxygen.

EXAMPLE XIII

Into a container of the type described in Example I was loaded recently slaughtered beef. After the loading the doors were closed and the oxygen concentration was reduced to a range of ½–1% in the container as described in Example I within a period of time of ½ to 1 hour. The oxygen concentration was thereafter maintained within a range of ½ to 1% by the method of this invention for a period of 6 weeks. The temperature in the compartment was reduced after purging by conventional refrigeration equipment from an initial temperature of 50° F. to a temperature just above the freezing point at a rate of about ¼–1° F. per hour. At the end of 6 weeks the meat was removed from the container and found to have maintained its color, did not have any slime formation thereon and retained its "bloom" and had a fresh appearance.

The procedure of Example XIII is repeated with dressed lamb, poultry and pork with equally good results.

EXAMPLE XIV

The procedure of Example XIII is repeated with the modification that the beef placed in the container is freshly slaughtered and the humidity is maintained within the container at the saturation point. The oxygen concentration is reduced to ½–1% over a period of about 60 minutes and the temperature is lowered after initial purging to a value within the range of 38–40° F. at a rate of ¼ to 1° F. per hour. The oxygen concentration is maintained in the container within the range of ½–1% by the method of this invention for a period of 10 days during transportation to the point of destination and subsequent storage. Upon removing the meat from the container, no slime was found on the surface of the meat as ordinarily is formed when the meat is cooled in the atmosphere in the presence of air with very high moisture content. There is no loss in weight and the meat has a fresh appearance.

The procedure of Example XIV is repeated with dressed lamb, poultry and pork with equally good results.

EXAMPLE XV

The process of the procedure of Example XIII is repeated with fresh fish with the modification that there is no reduction in the temperature after loading. The fish is maintained in a reduced oxygen atmosphere at a temperature of approximately about 35° F. At the end of 10 days, it is found that the fish is substantially as fresh as it was upon first loading.

EXAMPLE XVI

The procedure of Example XIII is repeated with live shell fish, comprising lobsters, oysters, crabs, and clams. The humidity in the container is maintained at about saturation point by commercially available humidity control means. The oxygen concentration in the container is reduced to a value within the range of 0.5–1% by rapidly purging with nitrogen as described in Example I within a period of about one hour. The temperature is reduced to just above the freezing point and maintained at that point for a period of 2 weeks during which time, the oxygen concentration is also maintained within .25–1% by the method described in Example I and elsewhere in this writing. It is found at the end of two weeks that the shell fish is substantially in as good condition as it is upon loading and still alive.

EXAMPLE XVII

The procedure of Example VII is followed with the modification that the produce is comprised of fresh beef, pork, lamb and poultry packaged in small, convenient to handle containers having a capacity of about 25 pounds of produce each. The oxygen concentration in each of the containers is reduced to about ¼% within a period of about 10 minutes by a flow of nitrogen into the small containers. Thereafter the oxygen concentration is maintained at such level by intermittent flow of purge gas into the individual containers as required by the oxygen sensing system in each. The temperature of the meat in the various containers is reduced from about 50° F. to about 38° F. by circulating refrigerated air around the individual containers. After 10 days, the meat is removed from the individual containers and is found to have suffered substantially no deteriorative degradation. There is no discoloration on the surface of the meat nor is there any formation of slime. No loss of weight has occurred.

The method of Example XVII was repeated with the modification that the equipment shown in FIG. 7 and described in the specification, was employed with equally good results.

The method of Example XVII was repeated with the modification that the equipment shown in FIG. 6 and described in the specification, was employed with equally good results.

EXAMPLE XVIII

Lettuce was harvested and then precooled during subsequent handling and packaging operations to a temperature of 37° F. During the subsequent handling and loading into a container of the type disclosed in this writing which took one hour, the temperature rose due to ambient heat transfer and respiratory activity to 41° F. Using the procedure of Example I, the oxygen concentration in the container was reduced and maintained at about 1% for a period of 7 days. The reduction of the oxygen concentration was accomplished in about 60 minutes. The temperature of about 41° F., at which the lettuce was loaded into the container after precooling, was reduced to about 36° F. in a period of about 24 hours. Upon arrival at destination, about one week later, it was found there was substantially no deterioration of the lettuce.

EXAMPLE XIX

The method of Example I was repeated with a first portion of a quantity of lettuce with the modification that at the end of the first 72-hour period, after the temperature of the lettuce had been reduced to 35° F., the lettuce was examined and found to demonstrate no significant physiological change compared with its condition when first loaded. A second portion of this same quantity of lettuce was instead precooled rapidly, within two hours after picking, by conventional vacuum cooling means and stored for 72 hours under normal refrigerated air storage conditions at 35° F. At the end of this period, the second portion showed significant degradation in surface oxidation and disease development. A third portion of this same quantity of lettuce was rapidly precooled by conventional means as described above to 35° F. and then stored for the same 72 hour period under the same conditions as was the first portion of lettuce. Comparison of the third portion with the first portion of lettuce at the end of their storage period showed that the first portion of lettuce which was cooled slowly by the inexpensive method of this invention was in every respect as good as the third portion which was precooled prior to storage by the very expensive conventional equipment.

EXAMPLE XX

A shipment of lettuce was made employing the method described in Example I with the modification that the oxygen concentration in the container was not lowered below that of ambient air conditions. Upon reaching destination one week later it was found that the mechanical refrigeration equipment had been unable to reduce the temperature of the lettuce from the temperature of 80° F. at which it had been loaded into the container but had, instead, allowed it to rise to 85° F. Examination showed substantial degradation sufficient to completely destroy the market value of the shipment.

EXAMPLE XXI

A load of green snap beans, at 75° F., was placed in a small bag container in a way so that substantially little free air space remained and a pre-set mixture of 1% oxygen, 99% nitrogen was caused to flow at a constant slow rate into this bag and around the beans and out of an outlet and into other similar bags in a series. The bag was placed in a room with low refrigerating capacity and at a temperature of 35° F. Upon examination at the end of the storage period, about two weeks later, it was found that the temperature of the beans was 35° F. and that no deterioration had taken place.

EXAMPLE XXII

A lift truck load of canteloupe at about 85° F. is driven by a lift truck operator wearing oxygen breathing equipment from outside ambient conditions through interlocking compartment doors into a refrigerated warehouse storage room in which the oxygen content of the atmosphere has been reduced to 2% by the use of nitrogen gas. Upon examination two weeks later it is found that the temperature of the canteloupe has been reduced to 39° F., the temperature of the warehouse, and that substantially no deterioration or change in color of sugar content or further ripening of the canteloupe has taken place.

Many times produce will be partially cooled so that some substantial amount of sensible product heat is removed by conventional means such as unusually high capacity refrigeration or vacuum cooling equipment during or prior to its initial packing and handling processes. Subsequently, after packing and loading into warehouse storage or transportable containers because its respiration rate continues to be comparatively high, further reduction of this produce continues to be difficult when using conventional refrigeration equipment which is basically designed to hold temperature, not lower it. This is because the respiration rate of most fresh produce is for example, several times higher at 10° F. above their freezing point than it is immediately above this freezing point and continues to increase in rate substantially with each degree of higher temperature. Thus, it is seen that there is a need of the unique process of this invention even for small temperature reduction of products as illustrated in the examples, since it is always less expensive to cool slowly with small capacity refrigeration means than to cool rapidly with high-capacity means.

The invention has been described hereinabove with the use of illustrative examples and drawings of typical equipment that can be used in carrying out the novel method of this invention; however, such examples and illustrations are to be taken by way of example only and are not to be taken by way of limitation. The invention is to be construed broadly within its spirit and scope as set forth in the following claims.

What is claimed is:

1. A method of retarding the deteriorative degradation of plant and animal matter which is subject to such degradation in the presence of oxygen, comprising:
    loading said matter into a container adapted to the passage of gases thereinto and therefrom,
    rapidly purging said container of the atmosphere it contained on loading by the admission to said container of a purge gas which substantially does not promote said deteriorative degradation until the oxygen content in the cover atmosphere in said container is reduced to a predetermined value within a range of from about ¼% to about 5% by volume of said atmosphere and the balance of said atmosphere is substantially inert,
    said purging being effected within a first time period such that there is substantially negligible deteriorative degradation of said matter during said first time period,
    renewing the cover atmosphere in said container during a second period of time, following said first time period, by the admission of said purge gas to said container in an amount sufficient to maintain the oxygen content in said cover atmosphere at substantially said predetermined value.

2. The method of claim 1 wherein said purge gas is substantially nitrogen.

3. The method of claim 1, wherein:
    during said second period of time, the said cover atmosphere is renewed intermittently by the admission of an amount of said purge gas sufficient to maintain the oxygen content thereof substantially at said predetermined value during said second period.

4. The method of claim 3, comprising, in addition, the step of:
    cooling said matter to a predetermined reduced temperature intermediate the temperature at which it is placed in said container and its freezing point but excluding the freezing point.

5. The method of claim 4, wherein said temperature is reduced by at least about 5° F.

6. The method of claim 4, wherein said temperature is reduced in said container at the rate of from about ¼° F. to about 1° F. per hour.

7. The method of claim 4, wherein said purge gas is substantially nitrogen.

8. The method of claim 3, wherein the rate of admission of purge gas during said first time period is from about 4 to about 2,000 times the average rate of admission during said second time period.

9. The method of claim 1 comprising, in addition:
    sensing the oxygen concentration in said container, discontinuing the flow of said purge gas into said container when the sensed oxygen concentration therein falls below said predetermined value, and
    initiating the flow of said purge gas into said container when the sensed oxygen concentration therein rises above said predetermined value.

10. The method of claim 9, wherein said purge gas is substantially nitrogen.

11. The method of claim 7, wherein said matter is comprised of animal matter.

12. The method of claim 7, wherein said matter is comprised of fresh meat.

13. The method of claim 7, wherein said matter is comprised of live seafood.

14. The method of claim 7, wherein said matter is comprised of fresh seafood.

15. The method of claim 1, comprising in addition the step of:
    cooling said matter to a predetermined reduced temperature intermediate the temperature at which it is placed in said container and its freezing point but excluding the freezing point.

16. The method of claim 15 wherein said matter is comprised of flowers.

References Cited

UNITED STATES PATENTS

| | | | |
|---|---|---|---|
| 2,569,217 | 9/1951 | Bagdijian | 99—189 X |
| 2,789,059 | 4/1957 | Lindewald | 99—189 |
| 2,948,123 | 8/1960 | Morrison | 99—198 X |
| 3,102,777 | 9/1963 | Bedrosian et al. | 99—189 |
| 3,239,360 | 3/1966 | Dixon | 99—154 |

FOREIGN PATENTS 457,888   12/1936   Great Britain.

HYMAN LORD, *Primary Examiner.*